United States Patent
Biebach

(10) Patent No.: US 10,421,363 B2
(45) Date of Patent: Sep. 24, 2019

(54) DRIVE FOR A BOAT AND METHOD FOR OPERATING A DRIVE FOR A BOAT

(71) Applicant: Torqeedo GmbH, Gilching (DE)

(72) Inventor: Jens Biebach, Tutzing (DE)

(73) Assignee: Torqeedo GmbH, Gilching (DE)

( * ) Notice: Subject to any disclaimer, the term of this patent is extended or adjusted under 35 U.S.C. 154(b) by 18 days.

(21) Appl. No.: 15/811,500

(22) Filed: Nov. 13, 2017

(65) Prior Publication Data

US 2018/0134162 A1 May 17, 2018

(30) Foreign Application Priority Data

Nov. 14, 2016 (DE) .................. 10 2016 121 800

(51) Int. Cl.
| | |
|---|---|
| *B63H 21/17* | (2006.01) |
| *B60L 8/00* | (2006.01) |
| *B63H 23/24* | (2006.01) |
| *B63H 21/21* | (2006.01) |
| *B60L 50/15* | (2019.01) |

(52) U.S. Cl.
CPC .............. *B60L 8/00* (2013.01); *B60L 50/15* (2019.02); *B63H 21/17* (2013.01); *B63H 21/21* (2013.01); *B63H 23/24* (2013.01); *B60L 2200/32* (2013.01)

(58) Field of Classification Search
CPC . B60L 8/00; B60L 11/12; B63H 21/17; B63H 21/21; B63H 23/24
See application file for complete search history.

(56) References Cited

U.S. PATENT DOCUMENTS

| | | | |
|---|---|---|---|
| 3,238,911 A | 3/1966 | Pazulski | |
| 5,593,280 A * | 1/1997 | Takada .................. | B63H 20/245 416/137 |
| 8,330,288 B2 | 12/2012 | Larsson | |
| 8,950,827 B2 | 2/2015 | Wuerth et al. | |
| 2010/0009578 A1 | 1/2010 | Daum et al. | |
| 2011/0106348 A1 | 5/2011 | Krause et al. | |

FOREIGN PATENT DOCUMENTS

| | | |
|---|---|---|
| DE | 29 43 270 A1 | 5/1981 |
| DE | 10 2008 038 896 B3 | 4/2010 |
| DE | 20 2009 015 026 U1 | 4/2010 |

(Continued)

OTHER PUBLICATIONS

German Office Action issued in German counterpart application No. 10 2016 121 800.6 dated Sep. 8, 2017 (Four (4) pages).

(Continued)

*Primary Examiner* — Stephen P Avila
(74) *Attorney, Agent, or Firm* — Crowell & Moring LLP

(57) ABSTRACT

A drive for a boat, in particular a sailing boat, comprising an electric motor configured for the operation in the first quadrant and in the fourth quadrant, a propeller connected to the electric motor, and a control device. The control device is configured to operate the electric motor in the fourth quadrant in such a way that flow energy transmitted via the propeller to the electric motor is regenerated into electrical power. The control device is further configured to operate the electric motor such that a product of the propeller's pitch and rotational speed is smaller than a relative flow speed between the water and the drive.

12 Claims, 2 Drawing Sheets

(56) References Cited

FOREIGN PATENT DOCUMENTS

| FR | 3 017 597 A1 | 8/2015 |
|---|---|---|
| JP | 62-192995 U | 12/1987 |
| JP | 7-237589 A | 9/1995 |
| JP | 2001-270496 A | 10/2001 |
| JP | 2011-521842 A | 7/2011 |
| WO | WO 2015/082027 A1 | 6/2015 |

OTHER PUBLICATIONS

European Search Report issued in European counterpart application No. 17201586.9-1015 dated Mar. 23, 2018, with Statement of Relevancy (Nine (9) pages).
Japanese Office Action issued in Japanese counterpart application No. 2017-218988 dated Feb. 5, 2019, with partial English translation (Eleven (11) pages).

\* cited by examiner

DRIVE FOR A BOAT AND METHOD FOR OPERATING A DRIVE FOR A BOAT

CROSS REFERENCE TO RELATED APPLICATIONS

This application claims priority to German Patent Application No. DE 10 2016 121 800.6, filed Nov. 14, 2016, the disclosure of which is expressly incorporated by reference herein.

FIELD OF THE INVENTION

The present invention relates to a drive for a boat, in particular for a sailing boat, and a method for operating a drive for a boat.

BACKGROUND OF THE INVENTION

It is known to use boat drives with electric motors for moving boats, for example for maneuvering.

For supplying the electric drives with power, batteries are usually used which are carried in the boat and can be charged, for example, by means of a charger provided with a shore connection. If no shore connection is available, for example, because the boat is moving, generators with a combustion engine can be provided in the boat in order to charge the batteries, or solar cells or wind generators are known, by means of which the batteries can be charged.

In accordance with four quadrant control, electric motors in drives of boats are usually operated in the first quadrant for providing a forward thrust and thus for moving forwards, and in the third quadrant for providing a reverse thrust and thus for moving backwards or for stopping. The electric motor or the control device thereof usually receives the respective movement commands via a remote throttle control from an operator of the boat.

SUMMARY OF THE INVENTION

It is an object of the present invention to provide a drive for a boat, in particular a sailing boat, which provides an alternative procedure for charging the batteries.

The object is achieved by a drive and a method according to the embodiments described herein.

A drive for a boat, in particular a sailing boat, is proposed which comprises an electric motor, a propeller connected to the electric motor, and a control device. The control device is configured to operate the electric motor in the fourth quadrant in such a way that, by this motor, flow energy of the water surrounding the propeller and transmitted via the propeller to the electric motor is regenerated into electrical power.

In this case, and in the following description, a regeneration of electrical energy from flow energy is an at least partial conversion of the flow energy of the water into electrical power. Thus, it is possible to charge the batteries on board the boat by the movement of the boat through the water. This can be implemented particularly preferably in sailing boats since here the propulsion generated by the sails can be partially converted into electrical power. Thus, whilst sailing, a sailing boat can convert energy from its travel through the water into electrical power, by means of which the onboard batteries can be charged again.

Furthermore, the control device is preferably configured to operate the electric motor in the fourth quadrant in such a way that a product of a propeller pitch of the propeller and a rotational speed of the propeller is smaller than a relative flow speed between the water and the drive. In this way an optimized operation can be achieved and surplus electrical energy can be provided, which can then be used for charging the batteries.

In this case and in what follows, the term "quadrant" relates to the quadrants of a Cartesian coordinates system, wherein the rotational speed of the electric motor is plotted on the abscissa and the torque of the electric motor is plotted on the ordinate. In synchronous motors the rotational speed of the electric motor is also accompanied by a proportionately induced voltage. The torque is also characterized by the length and direction of the phase current indicator, which then describes the height and direction of the torque.

During operation in the first quadrant (so-called forward running) the torque and the direction of rotation are both positive and thus parallel. During operation in the second quadrant (so-called reverse running braking) the torque is positive and the direction of rotation is negative and thus antiparallel. During operation in the third quadrant (so-called reverse running) the torque and direction of rotation are both negative and thus also parallel. During operation in the fourth quadrant (so-called regeneration or also forward running braking) the torque is positive and the direction of rotation is negative and thus antiparallel. Thus, in the regeneration mode in the fourth quadrant the direction of rotation of the propeller is positive, whereas the torque of the propeller is negative.

Accordingly, the operation of the electric motor in the fourth quadrant takes place in such a way that the product of the rotational speed and the propeller pitch, in particular the magnitude thereof, is smaller than the relative flow speed, in particular the magnitude thereof. The product of the rotational speed and the propeller pitch may be the theoretical propulsion of the propeller which can be achieved with the same rotational speed and propeller pitch during operation in the first quadrant. In this case and in what follows, the ratio of the product of the rotational speed and the propeller pitch to the relative flow speed is also designated as the gain factor. In particular, the amplification factor can be constant and can be less than one. In this case and in what follows, the propeller pitch corresponds to the geometric pitch of the propeller. In particular the propeller pitch can correspond to the distance which the propeller would travel during a revolution in a solid material. The propeller pitch may be a constant or an averaged progressive pitch of the propeller.

By operation of the drive as a regenerator in the fourth quadrant it is possible to convert the flow energy of the water and/or the kinetic energy of the boat into electrical power for operation of the drive.

Alternatively or additionally it is possible that the boat contains a further drive which is operated, for example, by means of gasoline or diesel. The combination of the drive and the further drive can be a hybrid drive. The electrical drive can have an energy accumulator, such as for example a battery. The energy accumulator can serve for storage of the electrical power regenerated from the flow energy.

Furthermore, the control device can also be configured to operate the electric motor in such a way that the gain factor is constant. In this way it is possible to achieve a maximum regeneration performance. An optimal gain, that is to say the optimal ratio of propeller pitch and rotational speed to the relative speed, results for example from the geometry of the propeller, in particular a propeller shape and a propeller diameter. With a given geometry it is possible to calculate the optimal gain theoretically. The theoretically calculated value for the optimal gain can then be subjected, for example, to a practical verification and optimization performance during operation of the drive, for example using a regulating unit.

According to a preferred embodiment the propeller is designed as a folding propeller. A folding propeller is particularly preferably used in a sailing boot in order during sailing to provide the lowest possible resistance due to the drive, but to achieve high propulsion during use of the drive. In particular, the propeller can be a two-blade folding propeller.

The control device is configured to operate the electric motor, before the operation in the fourth quadrant, initially in the first quadrant, that is to say in forward running, in order to fold out the propeller. Thus, initially the propeller is accelerated to a predetermined rotational speed by means of the motor in order to enable folding out. The folding out of the folding propeller takes place on the basis of the centrifugal force of the propeller blades, which accordingly fold out above a specific rotational speed. The operation in the first quadrant can assist the opening of the propeller, since in motor-powered operation an action of force is produced which pushes the boat and thus also presses on the folding propeller. The operation of the propeller which is then folded out is then carried out in the fourth quadrant as described above.

Particularly preferably in this case the electric motor is kept constant at a rotational speed which, on the one hand, enables the most efficient operation possible of the electric motor in the third quadrant but, on the other hand, simultaneously also prevents the propeller from folding back in.

A folding propeller is characterized in that the propeller, in particular the blades or vanes thereof, can be folded in. This can be advantageous in the case of a drive for sailing boats, since the flow resistance of the propeller in sailing mode can be reduced. The propeller can be folded out for the use of the drive. This gives rise to the challenge that, on the basis of the centrifugal forces that occur, the propeller is normally folded out only during operation in the first quadrant and possibly in the third quadrant, that is to say with an active forward or reverse operation of the motor. Turning of the folded-in propeller by the inflowing water is neither possible nor desirable in normal operation—in fact the propeller is constructed so that without a drive it folds in reliably due to the electric motor in order to achieve the least possible resistance during sailing and thus with the motor switched off. However, it may be necessary to assist the folding closed of the propeller by securing the propeller or by operating it at a very low rotational speed. In other words, not only the folding up of the folding propeller, but also the folding closed of the folding propeller can be achieved by a corresponding control of the electric motor.

In order to enable operation in the fourth quadrant with a folding propeller during the travel through water, the electric motor can be operated, in particular temporarily, in the first quadrant. As a result, the propeller is folded out. If the relative flow speed is sufficiently high, in particular positive, it is possible to switch over to operation in the fourth quadrant and to maintain the rotation of the propeller due to the inflowing water, wherein the rotational speed of the propeller is controlled and monitored by the control unit. The direction of rotation of the propeller doesn't change due to the switching over of the operation from the first quadrant to the fourth quadrant. The propeller then continues to be folded out, wherein flow energy is now converted into electrical power.

Furthermore, it is possible that the propeller is configured to be operated first of all in the third quadrant for operation in the second quadrant.

Particularly preferably the control device is provided in order to provide at least one minimum rotational speed of the folding propeller in operation in the fourth quadrant, in order to prevent the propeller from folding in during operation in the fourth quadrant.

According to at least one embodiment of the drive, the relative flow speed comprises a boat speed and/or an absolute flow speed of the water. The relative flow speed may be a difference between the boat speed and the absolute flow speed. Particularly preferably, the relative flow speed is an approach flow speed of the water with respect to the propeller. The boat speed may be the speed of the boat relative to the ground. The absolute flow speed of the water may be an approach flow speed of the water measured in the region of the boat relative to the ground. In particular, in the event of stronger flows the speed of the boat relative to the ground can deviate from the speed of the boat through the water. For example, it is possible that the operation takes place in the fourth quadrant when the boat is at anchor. In this case the boat speed is negligibly low and the relative flow speed can be the absolute flow speed. Furthermore, it is possible that the boat moves through the water during the operation in the fourth quadrant. In the case of approximately flowless water such as, for example, in the case of a calm lake, the relative flow speed can be the boat speed over ground.

According to at least one embodiment the drive comprises at least one sensor. The at least one sensor is configured to determine the relative flow speed. The at least one sensor may be, for example, a dynamic pressure pipe, a flow sensor and/or further speed sensors. The drive preferably comprises a plurality of sensors. It is possible that at least one of the sensors is a sensor of the boat, which sensor is connected to the control device.

According to a preferred embodiment the sensor contains a GPS sensor and/or a flow sensor. In this case, for example, a GPS sensor and/or a flow sensor of the boat can be used. In particular, the boat speed of the boat, that is to say the speed in relation to the ground, can be determined precisely by means of a GPS sensor. Thus, in the case of low absolute flow speeds of the water the result is a very precise determination of the relative flow speed.

According to at least one embodiment of the drive the control device is configured to regulate the rotational speed of the propeller depending upon the determined relative flow speed. In this case the control device with the sensor can form, in particular, an open loop. For example, in the event of an increase in the relative flow speed the rotational speed of the propeller can be increased, or vice versa. Alternatively or in addition it is possible that the regulation takes place in such a way that the rotational speed of the propeller is kept, in particular in the case of a constant relative flow speed.

According to at least one embodiment the drive comprises a regulating device, and a power sensor for determining the power output by the electric motor. The control device forms with the power sensor a closed loop for regulating the rotational speed of the propeller. The closed loop is preferably a feedback loop. By means of the loop the rotational speed of the propeller can then be adapted depending upon the determined power of the electric motor. Thus, a power regulation may be responsible for specifying the rotational speed.

The regulating device is preferably configured to regulate the rotational speed of the propeller by means of a maximum power point tracker (MPPT). With such a method the output power is monitored, preferably continuously, by means of the power sensor. By means of the regulating device the rotational speed of the propeller can then be adapted depending upon the determined power of the electric motor. The rotational speed of the electric motor is preferably adapted by means of the maximum power point tracking in such a way that the transmitted output and thus the regeneration is at a maximum.

For the setting of an optimal working point of the electric motor, an open loop can preferably be combined with a closed loop. Thus, it is possible, first of all, to achieve a pilot control by means of an open loop for the rough setting of the working point. The fine optimization can then be achieved by means of a closed loop. The optimal working point is preferably a rotational speed of the electric motor or of the propeller, at which the regeneration is at a maximum. The regulation described above based upon the relative flow speed is suitable, for example as an open loop. The power adaptation described above can be used, in particular, for the closed loop.

Due to a combination of an open and a closed loop it is possible, in particular, to combine the advantages of both methods. An advantage of the use of an open loop based upon a measurement of the relative flow speed lies, for example, in the relative constancy of the boat speed both through the water and also over ground, so that it is possible to compensate well for hydrodynamically induced fluctuations of the torque of the propeller and/or of the electric motor, in particular on the basis of the absolute flow speed of the water. With the closed loop a precise optimization of the rotational speed by means of an optimization of the output power can be achieved. Through the combination of the open and the closed loop the gain of the closed loop can be reduced, so that the system acquires a higher stability.

According to at least one embodiment, the propeller pitch is a function of the relative flow speed. This is the case in propellers having an adjustable pitch, which are also known as autopropellers. In other words, the propeller pitch changes with a rising and/or falling relative flow speed. The control device is configured to regulate the rotational speed of the propeller depending upon the relative flow speed and this function.

The regulation preferably takes place by means of an open loop, in particular by means of the previously described open loop. Preferably for the case of the open loop, the drive can contain a storage unit in which the function is stored. For example, the function of the propeller pitch is stored as a look-up table in the storage unit. Alternatively or in addition, the regulation of the rotational speed in the case of such a speed-dependent propeller pitch can also take place by means of a maximum power point tracking. In this case the adaptation of the gain to the propeller pitch, which changes with the rotational speed, takes place adaptively as a function of the rotational speed. The tracking of the gain can also be carried out by maximum power point tracking.

In addition to the autopropellers, propellers are also known with an externally changeable pitch.

In the propellers with externally changeable propeller pitch, the propeller pitch can be adapted by the control device so that, in connection with the likewise adapted propeller speed, an optimization with respect to the operation in the fourth quadrant can be carried out and thus a maximum regeneration power can be achieved at the respective relative flow speed.

By taking account of the function by means of the control device it is possible to compensate for a change in the propeller geometry with the relative flow speed. This can be advantageous in particular for the case where the propeller is a folding propeller. In the case of a folding propeller it is possible that this gradually closes with an increasing speed of the boat in the water, and thus with an increasing relative flow speed. This can lead to a change in the propeller geometry and thus in the gain factor. For this case it can be advantageous to take account of a speed-dependent gain factor in particular using a look-up table.

Due to the proposed regulation it is also possible to react to the changing propeller geometry with increasing regeneration power and/or increasing flow speed. Due to an increased regeneration power and/or an increased flow speed, the folding propeller folds in to some extent at the same rotational speed and thus with the same centrifugal force having an opening action on the propeller blades, until a balance of forces is restored. Thus, the effective propeller geometry changes, which is taken into account by the proposed regulation during operation.

In this connection a device for locking the propeller blades in the folded-out position can be provided, which mechanically prevents folding in of the propeller blades in the regeneration operation and in particular with an increasing regeneration power or an increasing flow speed. The device for locking the propeller blades in the folded-out position is preferably also controlled by the control device or, on the basis of a predetermined operational model of the electric motor, can be transferred to the device for locking the propeller blades.

Furthermore, a method for operating a drive for a boat, in particular for a sailing boat, is provided. The method is preferably suitable for operating a drive for a boat described here. In other words, all features disclosed for the device are also disclosed for the method, and vice versa.

A drive is provided, wherein the drive comprises an electric motor, a propeller connected to the electric motor, and a control device. The propeller is introduced into water. The water has a relative flow speed with respect to the drive. The electric motor is operated by the control device in the fourth quadrant in such a way that the flow energy of the water transmitted by means of the propeller to the electric motor is regenerated into electrical power and that a product of a propeller pitch of the propeller and a rotational speed of the propeller is smaller than the relative flow speed.

According to at least one embodiment, the electric motor is operated in the fourth quadrant while the boat moves through the water. Such an operation is suitable in particular in the case of a sailing boat. In this case the sailing boat can be move using the sails.

Alternatively or additionally it is possible that the boat has a further drive, for example by means of an internal combustion engine by means of which the boat is moved through the water. Because of the movement of the boat the water moves with the relative flow speed to the drive of the boat. The flow energy resulting from this can then be converted partially into electrical power by the operation in the fourth quadrant. Alternatively or additionally in this case it is possible that the electric motor is operated in the fourth quadrant while the boat is at a fixed location relative to the ground, that is to say for example is lying at anchor. In this case is the flow energy results primarily from the flow of the water around the boat. This is particularly advantageous in areas with high tides or when lying in a river.

According to at least one embodiment, the propeller is a folding propeller. Before the operation of the electric motor in the fourth quadrant the electric motor is operated in the first quadrant in order to fold out the propeller. Operation, in particular temporarily, in the first quadrant assists folding out of the electric motor and thus creates the prerequisite for an operation as regenerator for regeneration of flow energy.

The electric motor is preferably operated in the first quadrant at a somewhat higher rotational speed and in the fourth quadrant at a somewhat lower rotational speed than the rotational speed at which the product of rotational speed and pitch corresponds to the relative flow speed.

According to at least one embodiment, the drive contains a regulating device and a power sensor for determining the power output by the electric motor. The regulating device forms with the power sensor a closed loop for regulating the rotational speed of the propeller. The rotational speed of the propeller is then set by means of maximum power point tracking using the closed loop.

Furthermore, a drive for a boat, in particular for a sailing boat, is proposed which comprises an electric motor and a propeller, which is connected to the electric motor and of which the axis of rotation is pivotable relative to a vertical axis of the electric motor oriented perpendicularly to the propeller shaft, and has a control device. According to the invention the control device is configured to pivot the axis of rotation of the propeller relative to the forward thrust operation by 180° about the vertical axis and to operate the electric motor in the second quadrant in such a way that, by this motor flow, energy transmitted via the propeller to the electric motor is regenerated into electrical power.

An arrangement of a propeller, of which the axis of rotation is pivotable with respect to the vertical axis, can be achieved for example by accommodating the electric motor and the propeller in a nacelle pivotable below the boat about the vertical axis, or by a pivotable Saildrive or Z-Drive.

Due to the reversal of the axis of rotation of the propeller, the propeller is oriented more or less opposite the direction of travel of the boat. Thus, the propeller can be set in rotation by the inflowing water, wherein the propeller then rotates backwards, that is to say in a direction of rotation which corresponds to a reverse thrust. A regeneration of the flow energy into electrical power can then take place by operation of the electric motor in the second quadrant.

If a folding propeller is to be used here, the inflowing water acts in the folding-out direction of the propeller, so that short-term operation in the third quadrant can be omitted.

The further embodiments which relate to the control and regulation of the electric motor, and are described above with respect to operation in the fourth quadrant, apply analogously to operation in the second quadrant.

Other objects, advantages and novel features of the present invention will become apparent from the following detailed description, taken in conjunction with the accompanying drawings, which illustrate, by way of example, the principles of one or more preferred embodiments.

DETAILED DESCRIPTION OF THE DRAWINGS

Figure 1:
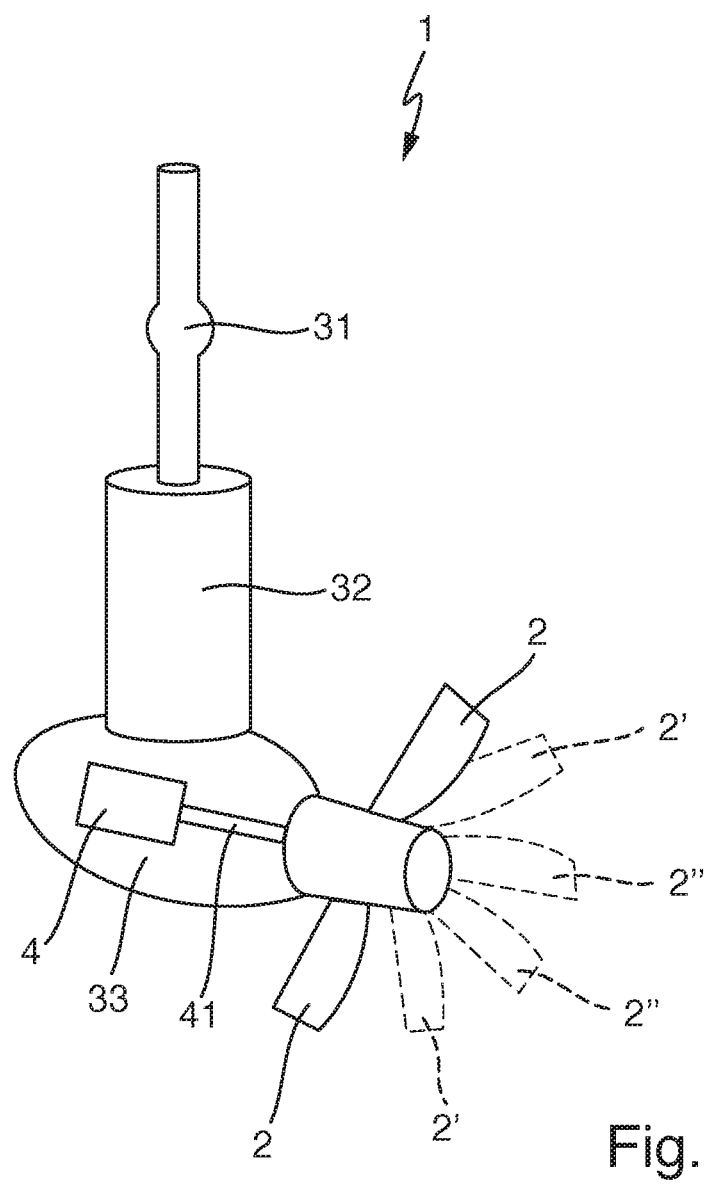
FIG. 1 shows a schematic representation of a first embodiment of a drive described here.

Exemplary embodiments are described below with reference to the drawings. Those having ordinary skill in the art may be able to make alterations and modifications to what is described herein without departing from its spirit and scope. While the disclosed invention is susceptible of embodiment in many different forms, there is shown in the drawings and will herein be described in detail at least one preferred embodiment of the invention with the understanding that the present disclosure is to be considered as an exemplification of the principles of the invention and is not intended to limit the broad aspect of the invention to the embodiment illustrated. Therefore, it should be understood that what is illustrated is set forth only for the purposes of example and should not be taken as a limitation on the scope of the present invention.

In this case elements which are the same, similar, of the same kind or act in the same way are provided with identical reference numerals in den different drawings. Repeated description of some of these elements is omitted in order to avoid redundancies. The drawings and the size ratios of the elements illustrated in the drawings elements should not be regarded as drawn to scale relative to one another. On the contrary, individual elements may be shown as excessively large for better illustration and/or to aid understanding.

A first exemplary embodiment of a drive 1 described here is explained in greater detail with reference to the schematic sketch in FIG. 1. The drive 1 comprises an electric motor 4 and a propeller 2, which is connected to the electric motor 4 by means of a drive shaft 41. A rotary movement of the electric motor 4, in particular the rotational speed thereof, can be transmitted to the propeller 2 by means of the drive shaft 41. Moreover, the drive 1 comprises a first housing 31, a second housing 32 and a third housing 33. The first housing 31 serves for example for fastening of the drive 1 on a hull of a boat. The third housing 33 contains the electric motor 4. The housing 31, 32, 33 can be designed to be watertight. In other words, devices such as for example the electric motor 4 located in the housings 31, 32, 33 can be protected against the water surrounding the boat by the respective housing 31, 32, 33.

The drive 1 further comprises a control device (not shown in the drawings) which is connected to the electric motor 4. The control device is configured to regulate the rotational speed of the electric motor 4 and thus also of the propeller 2. The control device can be introduced into one of the housings 31, 32, 33. Alternatively the control device can be mounted on board the boat.

The exemplary embodiment shown in the FIG. 1 relates to a pod drive 1 with a folding propeller 2. The propeller 2 can be configured to be folded in. In the folded-in position 2', 2" the propeller 2 has a lesser flow resistance than in the unfolded state.

The drive 1 can also have sensors (not shown in the drawings). A relative flow speed of the drive 1, and in particular of the propeller 2, in relation to the water surrounding the drive 1 can be determined, for example, by means of the sensors. Alternatively or in addition a power sensor can be connected to the electric motor 4 of the drive 1 and can determine the power output by the electric motor 4. The rotational speed of the electric motor 4—and thus also of the propeller 2—can be determined using maximum power point tracking.

Figure 2:
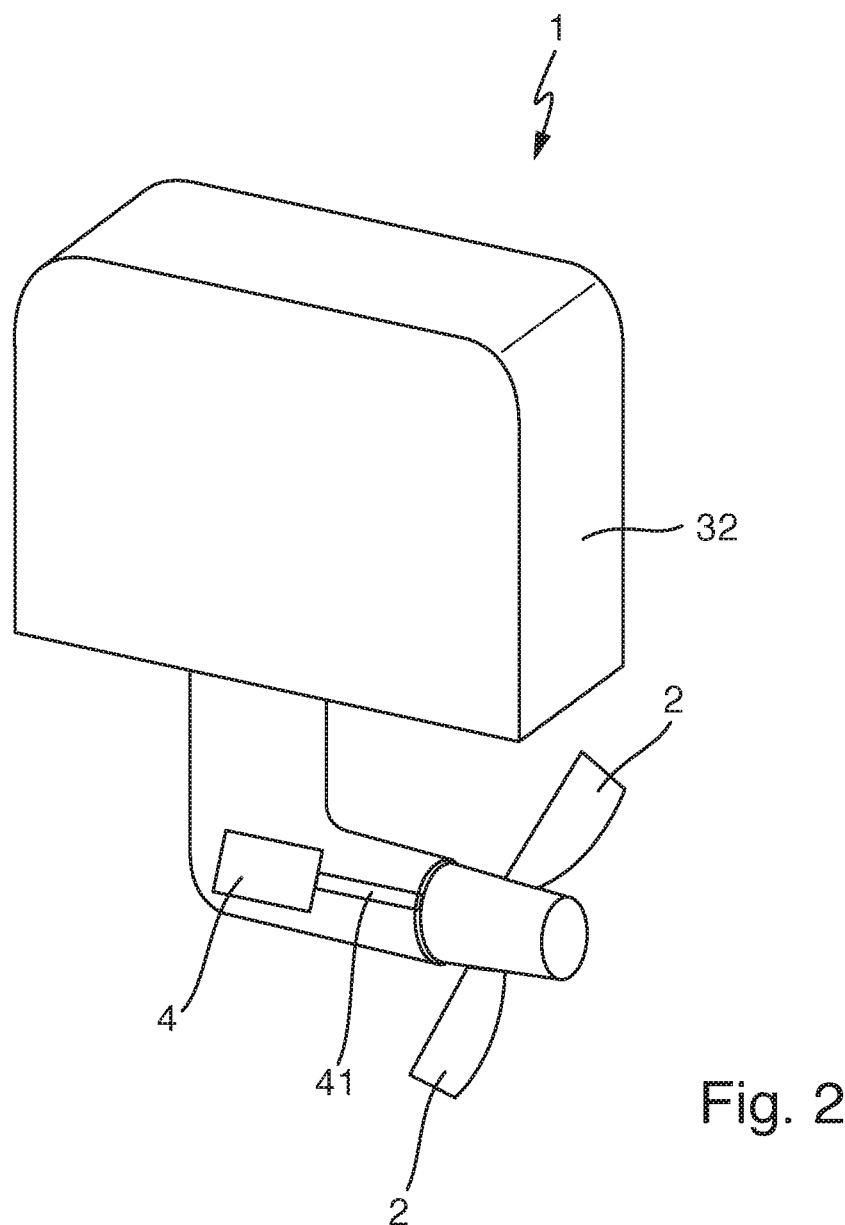
FIG. 2 shows a schematic representation of a second embodiment of a drive described here.

A second exemplary embodiment of a drive 1 described here is explained in greater detail with reference to the schematic sketch in FIG. 2. The drive 1 again comprises an electric motor 4 and a propeller 2. A second housing 32 of the drive 1 can be provided for fastening to a hull of a boat.

Contrary to the representation in the drawings, the propeller 2 can also include more than two propeller blades. For example, the propeller 2 can include three or more propeller blades.

The invention is not limited to these by the description with reference to the exemplary embodiments. On the contrary, the invention encompasses each new feature as well as any combination of features, in particular including any combination of features in the claims, even if this feature or this combination itself is not explicitly given in the claims or the exemplary embodiments.

The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The foregoing disclosure has been set forth merely to illustrate the invention and is not intended to be limiting. This disclosure is thus meant to be understood to include what is specifically illustrated and described above, what is conceptually equivalent, what can be obviously substituted, and also what incorporates the essential ideas. Since modifications of the disclosed embodiments incorporating the spirit and substance of the invention may occur to persons skilled in the art, the invention should be construed to include everything within the scope of the appended claims and equivalents thereof.

The scope of this description is indeed to be interpreted in conjunction with the appended claims and the claimed subject matter is what is intended to be patented.

LIST OF REFERENCE NUMERALS 1 drive
2 propeller
2',2" folded-in propeller
31 first housing
32 second housing
33 third housing
4 electric motor
41 drive shaft

What is claimed is:

1. A drive for a boat, comprising:
    an electric motor operable according to a four-quadrant control;
    a propeller connected to the electric motor;
    a control device configured to operate the electric motor in a fourth quadrant of the four-quadrant control in such a way that a flow energy transmitted via the propeller to the electric motor is regenerated by the electric motor into electrical power;
    a power sensor configured to determine the power output by the electric motor; and
    a regulating device, which together with the power sensor forms a closed loop for regulating the rotational speed of the propeller, the regulating device configured to regulate the rotational speed of the propeller via a maximum power point tracker.

2. The drive according to claim 1, wherein the control device is configured to operate the electric motor in such a way that a product of a propeller pitch of the propeller and a rotational speed of the propeller is smaller than a relative flow speed between the water and the drive.

3. The drive according to claim 1, wherein the propeller is a folding propeller, and the control device is configured to operate the electric motor, before the operation in the fourth quadrant, initially in a first quadrant, so as to fold out the propeller and to maintain a predetermined minimum rotational speed of the propeller.

4. The drive according to claim 2, wherein the propeller is a folding propeller, and the control device is configured to operate the electric motor, before the operation in the fourth quadrant, initially in a first quadrant, so as to fold out the propeller and to maintain a predetermined minimum rotational speed of the propeller.

5. The drive according to claim 1, further comprising:
    a sensor connected to the control device, the sensor determining the relative flow speed between the drive and the water.

6. The drive according to claim 5, wherein the control device is further configured to regulate the rotational speed of the propeller depending upon the determined relative flow speed.

7. The drive according to claim 1, further comprising:
    a global-positioning-system (GPS) sensor connected to the control device, the GPS sensor determining the relative ground speed of the drive.

8. The drive according to claim 7, wherein the control device is configured to regulate the rotational speed of the propeller depending upon the determined relative ground speed.

9. A method of operating a drive for a boat, the drive including an electric motor operable according to a four-quadrant control, a propeller connected to the electric motor, a power sensor that determines power output by the electric motor, a regulating device, and a control device controlling the operation of the electric motor, the method comprising:
    introducing the propeller into water, wherein the water has a relative flow speed with respect to the drive;
    operating the electric motor in the fourth quadrant with the control device in such a way that flow energy of the water transmitted via the propeller to the electric motor is regenerated by the electric motor into electrical power;
    forming a closed loop for regulating a rotational speed of the propeller via the power sensor and the regulating device; and
    setting the rotational speed of the propeller via a maximum power point tracking using the closed loop.

10. The method according to claim 9, further comprising:
    controlling via the control device the rotational speed of the propeller so that a product of the pitch of the propeller and the rotational speed of the propeller is smaller than the relative flow speed.

11. The method according to claim 10, wherein the propeller is a folding propeller and the method further comprising:
    operating the electric motor in the first quadrant before operating the electric motor in the fourth quadrant, wherein operating in the first quadrant folds out the propeller and maintains a predetermined minimum rotational speed of the propeller.

12. The method according to claim 9, wherein the propeller is a folding propeller and the method further comprising:
    operating the electric motor in the first quadrant before operating the electric motor in the fourth quadrant, wherein operating in the first quadrant folds out the propeller and maintains a predetermined minimum rotational speed of the propeller.

* * * * *